(12) United States Patent
Tang

(10) Patent No.: US 10,813,065 B2
(45) Date of Patent: Oct. 20, 2020

(54) METHOD AND DEVICE FOR SIGNAL DETECTION

(71) Applicant: GUANGDONG OPPO MOBILE TELECOMMUNICATIONS CORP., LTD., Dongguan, Guangdong (CN)

(72) Inventor: Hai Tang, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/309,364

(22) PCT Filed: Jul. 1, 2016

(86) PCT No.: PCT/CN2016/088244
§ 371 (c)(1),
(2) Date: Dec. 12, 2018

(87) PCT Pub. No.: WO2018/000440
PCT Pub. Date: Jan. 4, 2018

(65) Prior Publication Data
US 2019/0320397 A1    Oct. 17, 2019

(51) Int. Cl.
*H04W 56/00* (2009.01)
*H04W 76/11* (2018.01)
(Continued)

(52) U.S. Cl.
CPC ......... *H04W 56/001* (2013.01); *H04L 5/0094* (2013.01); *H04W 24/10* (2013.01); *H04W 56/0065* (2013.01); *H04W 76/11* (2018.02)

(58) Field of Classification Search
CPC .................................................. H04W 56/001
(Continued)

(56) References Cited

U.S. PATENT DOCUMENTS 9,276,726 B2    3/2016 Nam et al.
2009/0196279 A1*  8/2009 Kim ..................... H04J 11/0069
                                                     370/350
(Continued)

FOREIGN PATENT DOCUMENTS

CN    102291737 A    12/2011
CN    102547968 A    7/2012
(Continued)

OTHER PUBLICATIONS

International Search Report in international application No. PCT/CN2016/088244, dated Apr. 6, 2017.
(Continued)

*Primary Examiner* — Peter G Solinsky
(74) *Attorney, Agent, or Firm* — Ladas & Parry LLP

(57) ABSTRACT

Disclosed are a method and device for signal detection. The method comprises: a terminal receives system configuration information of a second transmission point sent by a first transmission point; the terminal performs downlink signal detection on the second transmission point according to the system configuration information of the second transmission point. The terminal in embodiments of the present invention can obtain the system configuration information of the second transmission point from the first transmission point, thereby reducing the complexity of signal detection on the second transmission point by the terminal.

18 Claims, 4 Drawing Sheets

(51) Int. Cl.
   *H04L 5/00*     (2006.01)
   *H04W 24/10*    (2009.01)
(58) Field of Classification Search
   USPC .................................................. 370/329
   See application file for complete search history.

(56) References Cited

U.S. PATENT DOCUMENTS

| | | | |
|---|---|---|---|
| 2011/0269470 A1 | 11/2011 | Song | |
| 2011/0312316 A1 | 12/2011 | Baldemair | |
| 2012/0071198 A1* | 3/2012 | Song | H04L 5/0023 455/524 |
| 2012/0127964 A1 | 5/2012 | Turtinen | |
| 2013/0155891 A1* | 6/2013 | Dinan | H04W 28/0236 370/252 |
| 2013/0258882 A1* | 10/2013 | Dinan | H04L 27/2662 370/252 |
| 2014/0010201 A1 | 1/2014 | Song et al. | |
| 2014/0051426 A1 | 2/2014 | Siomina et al. | |
| 2014/0161070 A1* | 6/2014 | Chang | H04L 1/00 370/329 |
| 2014/0171073 A1 | 6/2014 | Kim et al. | |
| 2014/0200003 A1* | 7/2014 | Kodali | H04W 36/30 455/436 |
| 2014/0287753 A1 | 9/2014 | Schulist et al. | |
| 2015/0311988 A1 | 10/2015 | Baldemair et al. | |
| 2016/0205692 A1 | 7/2016 | Zhang | |
| 2016/0261386 A1 | 9/2016 | Song et al. | |
| 2017/0295554 A1* | 10/2017 | Lee | H04J 11/0069 |
| 2017/0303220 A1* | 10/2017 | Sadeghi | H04W 72/042 |
| 2018/0139654 A1* | 5/2018 | Takano | H04W 76/10 |
| 2018/0249467 A1* | 8/2018 | Zheng | H04W 56/0005 |
| 2018/0294931 A1 | 10/2018 | Song et al. | |
| 2019/0045521 A1* | 2/2019 | Hong | H04W 72/0446 |
| 2019/0222460 A1* | 7/2019 | Kim | H04L 27/2611 |

FOREIGN PATENT DOCUMENTS

| | | |
|---|---|---|
| CN | 103220249 A | 7/2013 |
| CN | 104519512 A | 4/2015 |
| CN | 104703164 A | 6/2015 |
| CN | 105472744 A | 4/2016 |
| CN | 105580411 A | 5/2016 |
| EP | 2387163 A1 | 11/2011 |
| EP | 2945428 A1 | 11/2015 |
| EP | 3043610 A1 | 7/2016 |
| JP | 2010507315 A | 3/2010 |
| RU | 2573220 C2 | 1/2016 |
| WO | 2010081293 A1 | 7/2010 |
| WO | 2011157164 A1 | 12/2011 |
| WO | 2015042858 A1 | 4/2015 |
| WO | 2015170509 A1 | 11/2015 |
| WO | 2015174731 A1 | 11/2015 |
| WO | 2016048069 A1 | 3/2016 |

OTHER PUBLICATIONS

Written Opinion of the International Search Authority in international application No. PCT/CN2016/088244, dated Apr. 6, 2017.
Supplementary European Search Report in the European application No. 16906839.2, dated May 24, 2019.
English translation of the Written Opinion of the International Search Authority in the international application No. PCT/CN2016/088244, dated Apr. 6, 2017.
First Office Action of Chinese application No. 201680087189.X, dated Aug. 30, 2019.
Written Opinion of in corresponding Singaporean application No. 11201811824R, dated Mar. 10, 2020.
First Office Action in corresponding European application No. 16906839.2, dated Apr. 6, 2020.
Notice of Allowance in corresponding Russian application No. 2019102852, dated May 22, 2020.
Notice of Rejection in corresponding Chinese application No. 201680087189.X, dated Mar. 9, 2020.
R2-103427, 36. 300 "Stage 2 description of Carrier Aggregation", 3GPP TSG-RAN WG2 Meet ing #70, Montreal, Canada,May 10-14, 2010.
Second Office Action in corresponding Chinese application No. 201680087189.X, dated Dec. 18, 2019.
Notice of Allowance to be Issued in corresponding Chilean application No. 201803884, dated Mar. 16, 2020.
First Office Action of Russian application No. 2019102852, dated Jan. 28, 2020.
First Office Action of the Japanese application No. 2018-568430, dated Jun. 26, 2020.
Office Action of the Indian application No. 201917003847, dated Aug. 14, 2020.
First Office Action of the Israel application No. 264019, dated Jul. 14, 2020.
First Office Action of the Brazilian application No. BR1120180774456, dated Aug. 11, 2020.

* cited by examiner

METHOD AND DEVICE FOR SIGNAL DETECTION

RELATED APPLICATION

This application is an application under 35 U.S.C. 371 of International Application No. PCT/CN2016/088244 filed on Jul. 1, 2016, the entire contents of which are incorporated herein by reference.

TECHNICAL FIELD

The disclosure relates to the field of communications, and more particularly to a method and device for signal detection.

BACKGROUND

According to existing researches on a 5th-Generation (5G) mobile communication technology, a terminal may be respectively accessed to a 5G network and a Long Term Evolution (LTE) network on different frequency bands. In the LTE network, the terminal may perform cell access according to an existing cell access mechanism of the LTE system.

For a terminal that has been accessed to the LTE network, when the network further needs to be accessed to the 5G network, it is necessary to perform the cell access again on a frequency point in the 5G network. In this case, relatively high complexity of signal detection may be required once the terminal still employs the cell access mechanism in the LTE to perform the cell access in the 5G network.

SUMMARY

The embodiments of the disclosure provide a method and a device for signal detection, which may simplify the complexity of a terminal on a downlink signal detection process.

According to a first aspect, the disclosure provides a method for signal detection, which includes the following operations. A terminal receives from a first Transmission Point (TP) system configuration information of a second TP. The terminal performs downlink signal detection of the second TP according to the system configuration information of the second TP.

In the embodiments of the disclosure, the terminal can acquire the system configuration information of the second TP from the first TP, thereby reducing the complexity of the terminal to perform the signal detection of the second TP.

In combination with the first aspect, in one implementation mode of the first aspect, the system configuration information includes at least one of the following information: working frequency point information of the second TP, system bandwidth information of the second TP, time synchronization information of the second TP relative to the first TP, sub-carrier spacing information of the second TP, prefix information of a signal of the second TP, configuration information on structure of sub-frames of the second TP, configuration information on uplink and downlink time slots of the second TP, configuration information on a synchronization signal of the second TP, configuration information on a reference signal of the second TP, Identifier (ID) information of the second TP or antenna configuration information of the second TP.

In the embodiments of the disclosure, the terminal may acquire the system configuration information of the second TP via the first TP, thereby reducing the complexity of the terminal to perform the downlink signal detection of the second TP to some extent.

In combination with the first aspect or any abovementioned implementation mode, in another implementation mode of the first aspect, the time synchronization information of the second TP relative to the first TP includes at least one of indication information for indicating whether the second TP is synchronous with the first TP or a time synchronization offset of the second TP relative to the first TP.

In the embodiments of the disclosure, the terminal may acquire the time synchronization information of the second TP relative to the first TP via the first TP, thereby reducing the complexity of the terminal to perform the downlink signal detection of the second TP to some extent.

In combination with the first aspect or any abovementioned implementation mode, in another implementation mode of the first aspect, the time synchronization information includes the indication information for indicating whether the second TP is synchronous with the first TP. The operation that the terminal performs downlink signal detection of the second TP according to the system configuration information of the second TP includes the following actions. Responsive to indicating that the second TP is synchronous with the first TP, the terminal performs the downlink signal detection of the second TP according to downlink timing of the first TP. In an alternative example, the terminal determines a detection window for the synchronization signal of the second TP according to the downlink timing of the first TP, the terminal performs synchronization signal detection of the second TP in the detection window to obtain the synchronization reference of the second TP, and the terminal performs the downlink signal detection of the second TP according to the synchronization reference of the second TP.

In the embodiments of the disclosure, the terminal may determine that the terminal performs the downlink signal detection of the second TP at the downlink timing of the first TP via the time synchronization information of the second TP relative to the first TP, thereby reducing the complexity of the terminal to perform the downlink signal detection of the second TP to some extent.

In combination with the first aspect or any abovementioned implementation mode, in another implementation mode of the first aspect, the time synchronization information includes the indication information for indicating whether the second TP is synchronous with the first TP. The operation that the terminal performs downlink signal detection of the second TP according to the system configuration information of the second TP includes the following actions. Responsive to indicating that the second TP is asynchronous with the first TP, the terminal detects the synchronization signal of the second TP to obtain the synchronization reference of the second TP. The terminal performs the downlink signal detection of the second TP according to the synchronization reference of the second TP.

In combination with the first aspect or any abovementioned implementation mode, in another implementation mode of the first aspect, the time synchronization offset of the second TP relative to the first TP includes at least one of a radio frame offset of the second TP relative to the first TP, a sub-frame offset of the second TP relative to the first TP, a Transmission Time Interval (TTI) offset of the second TP relative to the first TP, or a transmission symbol offset of the second TP relative to the first TP.

In combination with the first aspect or any abovementioned implementation mode, in another implementation mode of the first aspect, the time synchronization information includes the time synchronization offset of the second TP relative to the first TP. The operation that the terminal performs downlink signal detection of the second TP according to the system configuration information of the second TP includes the following actions. The terminal determines a detection window for the synchronization signal of the second TP according to the time synchronization offset and a time-frequency resource predetermined for the synchronization signal of the second TP. The terminal performs synchronization signal detection of the second TP in the detection window to obtain the synchronization reference of the second TP. The terminal performs the downlink signal detection of the second TP according to the synchronization reference of the second TP.

In the embodiments of the disclosure, the terminal may determine the detection window for the synchronization signal of the second TP via the time synchronization offset of the second TP relative to the first TP, thereby reducing the complexity of the terminal to perform the downlink signal detection of the second TP to some extent.

In combination with the first aspect or any abovementioned implementation mode, in another implementation mode of the first aspect, the configuration information on the synchronization signal of the second TP includes at least one of resource position information of the synchronization signal or sequence information carried in the synchronization signal.

In the embodiments of the disclosure, the terminal can acquire the configuration information on the synchronization signal of the second TP from the first TP, thereby reducing the complexity of the terminal to perform the signal detection of the second TP.

In combination with the first aspect or any abovementioned implementation mode, in another implementation mode of the first aspect, the operation that the terminal performs downlink signal detection of the second TP according to the system configuration information of the second TP includes the following actions. The terminal determines at least one of time-frequency resource position or sequence information on the synchronization signal of the second TP according to at least one of the resource position information of the synchronization signal or the sequence information carried in the synchronization signal. The terminal detects the synchronization signal of the second TP according to the at least one of time-frequency resource position or sequence information to obtain the synchronization reference of the second T, and the terminal performs the downlink signal detection of the second TP according to the synchronization reference of the second TP.

In combination with the first aspect or any abovementioned implementation mode, in another implementation mode of the first aspect, the configuration information on the reference signal of the second TP includes at least one of: configuration information on time-frequency resources of the reference signal, sequence information of the reference signal, configuration information on transmitting power of the reference signal or port configuration information of the reference signal.

In the embodiments of the disclosure, the terminal can acquire the configuration information on the reference signal from the first TP, thereby reducing the complexity of the terminal to perform the signal detection of the second TP.

In combination with the first aspect or any abovementioned implementation mode, in another implementation mode of the first aspect, the system configuration information of the second TP includes the configuration information on the reference signal of the second TP. The operation that the terminal performs downlink signal detection of the second TP according to the system configuration information of the second TP includes the following actions. The terminal determines a configuration for the reference signal of the second TP according to the configuration information on the reference signal of the second TP. The terminal performs downlink Radio Resource Management (RRM) measurement of the second TP according to the configuration for the reference signal of the second TP. The method further includes that: the terminal generates an RRM measurement result; and the terminal sends the RRM measurement result to the first TP, or the terminal determines whether the second TP is detected according to the RRM measurement result.

In combination with the first aspect or any abovementioned implementation mode, in another implementation mode of the first aspect, the system configuration information of the second TP includes the working frequency point information of the second TP. The operation that the terminal performs downlink signal detection of the second TP according to the system configuration information of the second TP includes the following actions. The terminal determines a working frequency point of the second TP according to the working frequency point information of the second TP, and the terminal performs the downlink signal detection within a bandwidth where the working frequency point is located.

In combination with the first aspect or any abovementioned implementation mode, in another implementation mode of the first aspect, the prefix information of the signal of the second TP includes at least one of prefix type information or prefix length information.

In the embodiments of the disclosure, the terminal can acquire the prefix information of the signal of the second TP from the first TP, thereby reducing the complexity of the terminal to perform the signal detection of the second TP.

In combination with the first aspect or any abovementioned implementation mode, in another implementation mode of the first aspect, that the terminal performs downlink signal detection of the second TP according to the system configuration information of the second TP includes: the terminal determines at least one of a prefix type or a prefix length of a downlink signal of the second TP according to the prefix information of the signal of the second TP, and the terminal performs the downlink signal detection of the second TP. The downlink signal of the second TP is a downlink signal carrying a prefix corresponding to at least one of the prefix type or the prefix length.

In combination with the first aspect or any abovementioned implementation mode, in another implementation mode of the first aspect, the system configuration information of the second TP includes the sub-carrier spacing information of the second TP. The operation that the terminal performs downlink signal detection of the second TP according to the system configuration information of the second TP includes the following actions. The terminal determines a number of sub-carriers within a target bandwidth of the second TP according to the sub-carrier spacing information, and the terminal performs the downlink signal detection of the second TP according to the number of sub-carriers within the target bandwidth.

In combination with the first aspect or any abovementioned implementation mode, in another implementation mode of the first aspect, the configuration information on structure of sub-frames of the second TP includes at least one of: the number of Orthogonal Frequency Division Multiplexing (OFDM) symbols in a sub-frame, the number of Guard Periods (GPs) in the sub-frame, positions of the GPs in the sub-frame or the number of different types of OFDM symbols in the sub-frame.

In the embodiments of the disclosure, the terminal can acquire the configuration information on structure of sub-frames of the second TP from the first TP, thereby reducing the complexity of the terminal to perform the signal detection of the second TP.

In combination with the first aspect or any abovementioned implementation mode, in another implementation mode of the first aspect, the system configuration information includes the configuration information on structure of sub-frames of the second TP. The operation that the terminal performs downlink signal detection of the second TP according to the system configuration information of the second TP includes the following actions. The terminal determines a sub-frame structure of the second TP according to the configuration information on structure of sub-frames of the second TP, and the terminal performs the downlink signal detection of the second TP according to the sub-frame structure.

In combination with the first aspect or any abovementioned implementation mode, in another implementation mode of the first aspect, the system configuration information includes the system bandwidth information of the second TP. The operation that the terminal performs downlink signal detection of the second TP according to the system configuration information of the second TP includes the following actions. The terminal determines a system bandwidth of the second TP according to the system bandwidth information of the second TP, and the terminal performs the downlink signal detection within the system bandwidth of the second TP.

In combination with the first aspect or any abovementioned implementation mode, in another implementation mode of the first aspect, the system configuration information includes the configuration information on uplink and downlink time slots of the second TP. The operation that the terminal performs downlink signal detection of the second TP according to the system configuration information of the second TP includes the following actions. The terminal determines a time-frequency resource position of a downlink signal transmitted in the second TP according to the configuration information on the uplink and downlink time slots of the second TP; and the terminal performs the downlink signal detection of the second TP on the time-frequency resource position.

In combination with the first aspect or any abovementioned implementation mode, in another implementation mode of the first aspect, the system configuration information includes the antenna configuration information of the second TP. The operation that the terminal performs downlink signal detection of the second TP according to the system configuration information of the second TP includes the following actions. The terminal determines an antenna port used by the second TP for transmitting the downlink signal according to the antenna configuration information, and the terminal performs the downlink signal detection of the second TP according to the antenna port.

In combination with the first aspect or any abovementioned implementation mode, in another implementation mode of the first aspect, the system configuration information includes an ID of the second TP. The operation that the terminal performs downlink signal detection of the second TP according to the system configuration information of the second TP includes the following actions. The terminal determines at least one of a transmission format or a sequence for the downlink signal of the second TP according to the ID of the second TP. The terminal performs the downlink signal detection of the second TP according to at least one of the transmission format or the sequence for the downlink signal.

In combination with the first aspect or any abovementioned implementation mode, in another implementation mode of the first aspect, the first TP is a carrier for transmitting LTE data, and the second TP is a carrier for transmitting 5G New Radio (NR) data.

In combination with the first aspect or any abovementioned implementation mode, in another implementation mode of the first aspect, the method further includes the following operations. The terminal generates a measurement result or a detection result for the downlink signal of the second TP, and the terminal sends the measurement result or the detection result to the first TP.

In combination with the first aspect or any abovementioned implementation mode, in another implementation mode of the first aspect, the method further includes the following operation. The terminal sends an uplink signal to the second TP according to the system configuration information of the second TP.

According to a second aspect, the disclosure provides a method for signal detection, including the following operations. A first TP sends system configuration information of a second TP to a terminal, to enable the terminal to perform downlink signal detection of the second TP according to the system configuration information of the second TP.

In combination with the second aspect, in one possible implementation mode of the second aspect, the system configuration information includes at least one of: working frequency point information of the second TP, system bandwidth information of the second TP, time synchronization information of the second TP relative to the first TP, sub-carrier spacing information of the second TP, prefix information of a signal of the second TP, configuration information on structure of sub-frames of the second TP, configuration information on uplink and downlink time slots of the second TP, configuration information on a synchronization signal of the second TP, configuration information on a reference signal of the second TP, ID information of the second TP or antenna configuration information of the second TP.

In the embodiments of the disclosure, the terminal can acquire the system configuration information of the second TP from the first TP, thereby reducing the complexity of the terminal to perform the signal detection of the second TP.

In combination with the second aspect or any abovementioned implementation mode, in another implementation mode of the second aspect, the first TP is a carrier for transmitting LTE data, and the second TP is a carrier for transmitting 5G NR data. In combination with the second aspect or any abovementioned implementation mode, in another implementation mode of the second aspect, the method further includes: the first TP receives a measurement result or a detection result sent by the terminal for a downlink signal of the second TP.

According to a third aspect, the disclosure provides a device for signal detection, including modules for executing the method in the first aspect.

According to a fourth aspect, the disclosure provides a device for signal detection, including modules for executing the method in the second aspect.

According to a fifth aspect, the disclosure provides a device for signal detection. The device includes a memory, a processor, an input/output interface, a communication interface and a bus system. The memory, the processor, the input/output interface and the communication interface are connected through the system bus. The memory may be configured to store an instruction. The processor may be configured to execute the instruction stored in the memory, and when the instruction is executed, the processor may execute the method according to the first aspect through the communication interface and control the input/output interface to receive input data and information and output data such as an operation result.

According to a sixth aspect, the disclosure provides a device for signal detection. The device includes a memory, a processor, an input/output interface, a communication interface and a bus system. The memory, the processor, the input/output interface and the communication interface are connected through the system bus. The memory may be configured to store an instruction. The processor may be configured to execute the instruction stored in the memory, and when the instruction is executed, the processor may execute the method according to the second aspect through the communication interface and control the input/output interface to receive input data and information and output data such as an operation result.

According to a seventh aspect, the disclosure provides a computer-readable storage medium. The computer-readable storage medium may be configured to store a program code for the method for signal detection, and the program code may be configured to execute method instructions in the first aspect.

According to an eighth aspect, the disclosure provides a computer-readable storage medium. The computer-readable storage medium may be configured to store a program code for the method for signal detection, and the program code may be configured to execute method instructions in the second aspect.

BRIEF DESCRIPTION OF DRAWINGS

In order to describe the technical solutions in the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

It should be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE), a 5G New Radio (NR) system and the like.

It is also to be understood that a terminal may be called a terminal device or User Equipment (UE), may also be called a mobile terminal, a mobile user device and the like and may communicate with one or more core networks through, for example, a Radio Access Network (RAN). The UE may be a mobile terminal, for example, a mobile phone (or called as a "cellular" phone) and a computer with a mobile terminal, may be, for example, a portable, pocket, handheld, computer-embedded or vehicle-mounted mobile device and performs language and/or data exchange with the RAN.

A Transmission Point (TP) in the disclosure is also referred to a Transmission and Reception Point (TRP) and may also be a cell, a carrier, a Radio Remote Head (RRH), a beam formed by an antenna array and covering a certain range, a relay node, other network nodes (such as a Home eNode B or femtocell) or the like.

Figure 1:
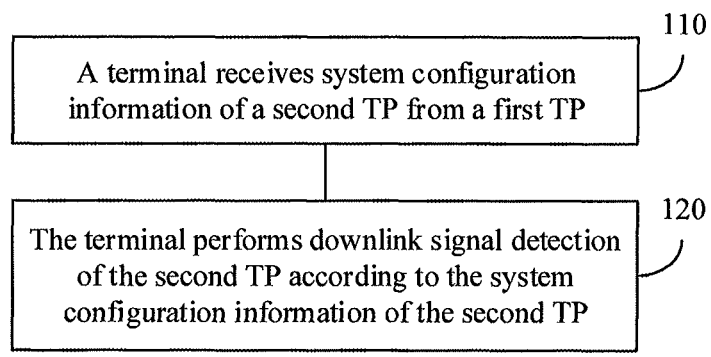
FIG. 1 is a schematic flowchart of a method for signal detection according to an embodiment of the disclosure.

FIG. 1 illustrates a method for signal detection according to an embodiment of the disclosure. The method illustrated in FIG. 1 includes the following operations.

At 110, a terminal receives system from a first TP configuration information of a second TP.

Specifically, the terminal may receive the system configuration information of the second TP that is sent by the first TP.

It should be understood that, the system configuration information of the second TP may be sent from the second TP to the first TP by enabling the terminal to trigger the second TP. It may also be that the terminal sends system configuration information of multiple alternative second TP to the first TP, and then the first TP triggers a second TP to send system configuration information of the second TP to the terminal through the first TP. The system configuration information of the second TP may also be pre-stored in the first TP and sent it from the first TP to the terminal, all of which will not be elaborated herein.

It should be further understood that, the terminal may receive the system configuration information of the second TP via a downlink signaling transmitted by the first TP. For example, the terminal may receive the downlink signaling sent by the first TP via a Radio Resource Control (RRC) signaling sent by the first TP.

In an optional embodiment, the system configuration information includes at least one of: working frequency point information of the second TP, system bandwidth information of the second TP, time synchronization information of the second TP relative to the first TP, sub-carrier spacing information of the second TP, prefix information of a signal of the second TP, configuration information on structure of sub-frames of the second TP, configuration information on uplink and downlink time slots of the second TP, configuration information on a synchronization signal of the second TP, configuration information on a reference signal of the second TP, ID information of the second TP or antenna configuration information of the second TP.

Specifically, the time synchronization information of the second TP relative to the first TP includes at least one of: indication information for indicating whether the second TP is synchronous with the first TP or a time synchronization offset of the second TP relative to the first TP.

The time synchronization offset of the second TP relative to the first TP includes at least one of: a radio frame offset of the second TP relative to the first TP, a sub-frame offset of the second TP relative to the first TP, a TTI offset of the second TP relative to the first TP or a transmission symbol offset of the second TP relative to the first TP.

For example, the radio frame offset N may indicate that N radio frames are spaced between the second TP and the first TP in time synchronization. Generally, the time length of a radio frame is 10 ms. The sub-frame offset N may indicate that the difference in time synchronization between the second TP and the first TP is N sub-frames. The TTI offset N may indicate that the difference in time synchronization between the second TP and the first TP is N TTIs. The symbol offset N may indicate that the difference in symbol between the second TP and the first TP is N symbols.

The configuration information on the synchronization signal of the second TP includes at least one of resource position information of the synchronization signal or sequence information carried in the synchronization signal.

The resource position information of the synchronization signal is used for indicating configuration information on time-frequency resources of the synchronization signal, a sub-frame at which the synchronization signal is located and a symbol at which the synchronization signal is located.

All or part of the sequence information carried in the synchronization signal may refer to all or part of information carried in the synchronization signal via a synchronization sequence. For example, the synchronization sequence may carry an full ID (ID) of the second TP or a part of information used for obtaining the ID of the second TP.

For example, when the ID of the second TP is ID=A*B, the synchronization signal may carry information A for indicating the ID of the second TP, and the terminal may determine B via subsequent detection on the downlink signal of the second TP. In another alternative example, the synchronization signal may carry the full ID of the second TP; and in this case, the terminal may directly acquire the ID of the second TP without a need for the terminal to re-detect a downlink signal subsequently transmitted by the second TP to determine B.

The system configuration information includes the configuration information on the reference signal of the second TP. The configuration information on the reference signal includes at least one of the following information: configuration information on time-frequency resources of the reference signal, sequence information of the reference signal, configuration information on transmitting power of the reference signal or port configuration information of the reference signal.

The configuration information on time-frequency resources of the reference signal may be configuration information on time-frequency resource transmission patterns of the reference signal, a transmission period for transmitting the reference signal, configuration information on a sub-frame used for transmitting the reference signal or the like.

The sequence information of the reference signal may be information such as a scrambling sequence ID of the reference signal, an orthogonal code length of the reference signal, an orthogonal code type of the reference signal or the like.

The port configuration information of the reference signal may be the number of antenna ports for transmitting the reference signal.

The prefix information for the signal of the second TP includes at least one of prefix type information or prefix length information.

The configuration information on structure of sub-frames of the second TP includes at least one of: the number of OFDM symbols in a sub-frame, the number of GPs in the sub-frame, positions of the GPs in the sub-frame, or the number of different types of OFDM symbols in the sub-frame.

The antenna configuration information may be used for indicating the number of antenna ports of the second TP, antenna types of the second TP or the like.

It should be understood that, information for indicating a system configuration of the second TP in the system configuration information may be combined in any manner and transmitted to the terminal via the first TP. There are no limits of the manner for combining the above information made in the disclosure.

For example, the terminal may determine a sequence of the reference signal according to the configuration information on the reference signal of the second TP in the system configuration information and the ID of the second TP, such as a Cell-specific Reference Signal (CRS) sequence or Channel Signal Information Reference Signal (CSI-RS).

In an optional embodiment, the first TP is a carrier for transmitting LTE data, and the second TP is a carrier for transmitting 5G NR data.

Specifically, the first TP may be a carrier used by a cell in a an LTE network currently resided by the terminal, and the second TP may be a carrier for transmitting the NR data in the 5G network to which the terminal is accessed.

It should be understood that, the first TP and the second TP may be carriers for transmitting the data in different network types, which will not be elaborated herein.

At 120, the terminal performs downlink signal detection of the second TP according to the system configuration information of the second TP.

It is to be noted that, the operation that the terminal performs downlink signal detection of the second TP may include the following actions. The terminal modulates the downlink signal of the second TP, the terminal measures the downlink signal of the second TP and the like, which will not be elaborated herein.

In an optional embodiment, the time synchronization information includes the indication information for indicating whether the second TP is synchronous with the first TP, the operation that the terminal performs downlink signal detection of the second TP according to the system configuration information of the second TP includes the following actions. When the second TP is synchronous with the first TP, the terminal performs the downlink signal detection of the second TP according to downlink timing of the first TP;

or, the terminal determines a detection window for the synchronization signal of the second TP according to the downlink timing of the first TP, performs synchronization signal detection of the second TP in the detection window to obtain the synchronization reference of the second TP and performs the downlink signal detection of the second TP according to the synchronization reference of the second TP.

Specifically, the terminal may determine whether the second TP is synchronous with the first TP according to the indication information. When the first TP is synchronous with the second TP, the terminal may perform the detection on the downlink signal of the second TP.

For example, when the first TP is synchronous with the second TP, the terminal may obtain the downlink timing from the first TP. The downlink timing may refer to a start time for a radio frame or a radio sub-frame and taken as a start time for a radio frame or a radio sub-frame of the second TP, and thus the terminal may determine a time sequence for the radio frame or the radio sub-frame of the second TP. In other words, the terminal may determine a boundary and an index for the radio frame of the second TP according to the downlink timing obtained by the first TP.

When the first TP is synchronous with the second TP, the terminal may further take the downlink timing of the first TP as downlink timing for the downlink signal of the second TP and selects a detection window nearby the downlink timing as a detection window for the downlink signal of the second TP. The terminal may perform the detection of the downlink signal of the second TP in the detection window.

For example, when the first TP is synchronous with the second TP, the terminal may further determine an estimated time-frequency resource position for the synchronization signal of the second TP according to the downlink timing obtained from the first TP and the time-frequency resources for the synchronization signal of the second TP, and determine a signal detection window nearby the estimated time-frequency resource position for the synchronization signal as the detection window for the downlink signal of the second TP. For example, the terminal may determine a signal detection window which takes the estimated time-frequency resource position as a center and length of which is K microsecond as the detection window for the downlink signal of the second TP.

It should be further understood that, when the terminal determines that the second TP is not synchronous with the first TP via the indication information, the terminal may further obtain other information of the second TP for downlink signal measurement or detection via the first TP to detect a downlink synchronization signal of the second TP, which will not be elaborated herein.

In an optional embodiment, the time synchronization information includes the indication information for indicating whether the second TP is synchronous with the first TP, and the operation that the terminal performs downlink signal detection of the second TP according to the system configuration information of the second TP includes the following actions. When the second TP is not synchronous with the first TP, the terminal detects the synchronization signal of the second TP to obtain the synchronization reference of the second TP, and the terminal performs the downlink signal detection of the second TP according to the synchronization reference of the second TP.

Specifically, the terminal may acquire the synchronization reference of the second TP through the detection on the synchronization signal of the second TP. The synchronization reference of the second TP may be at least one of a time synchronization reference of the second TP or a frequency synchronization reference of the second TP. The synchronization reference of the second TP includes information such as symbol clock and frequency information of the second TP, a cell bandwidth, a cell ID, frame block information, a cell multi-antenna configuration, a Broadcast Channel (BCH) bandwidth, a Synchronization Channel (SCH), and a length of a Cyclic Prefix (CP) of the sub-frame where a BCH is located, etc.

In an optional embodiment, the time synchronization information includes the time synchronization offset of the second TP relative to the first TP, and the operation that the terminal performs downlink signal detection of the second TP according to the system configuration information of the second TP includes the following action. The terminal determines the detection window for the synchronization signal of the second TP according to the time synchronization offset and a time-frequency resource predetermined for the synchronization signal of the second TP. The terminal performs synchronization signal detection of the second TP in the detection window to obtain the synchronization reference of the second TP, and the terminal performs the downlink signal detection of the second TP according to the synchronization reference of the second TP.

Specifically, the terminal may estimate the downlink timing of the second TP according to the downlink timing of the first TP and the time offset of the second TP. In other words, the downlink timing of the second TP may be estimated by performing a time offset corresponding to the time offset on the downlink timing of the first TP. The terminal determines the estimated time-frequency resource position for the synchronization signal of the second TP according to the time-frequency resource position for the synchronization signal of the second TP and the estimated downlink timing of the second TP, and the terminal determines a detection window nearby the estimated time-frequency resource position as the detection window for the downlink signal of the second TP.

For example, the terminal may determine time-frequency resources for a Primary Synchronization Signal (PSS) of the second TP. For a Frequency Division Duplexing (FDD) mode, the PSS may be carried on a last one OFDM symbol of a slot0 and a slot10. The terminal performs detection on the PSS in time-frequency resources where the PSS is located. The terminal may acquire a cell ID in a cell group and simultaneously may further determine a time slot boundary at 5 ms to obtain time slot synchronization.

The terminal may further determine a reference time-frequency resource position for the synchronization signal of the second TP according to the downlink timing of the first TP and the time-frequency resource position for the synchronization signal of the second TP. In other words, the reference time-frequency resource position for the synchronization signal of the second TP is determined based on the downlink timing of the first TP. The terminal may further determine the estimated time-frequency resource position for the synchronization signal of the second TP according to the time offset of the second TP relative to the first TP and the reference time-frequency resource position for the synchronization signal. The terminal may take a window nearby the estimated time-frequency resource as the detection window.

It is to be noted that, the estimated time-frequency resource position for the synchronization signal of the second TP may be obtained by performing a time offset corresponding to the time offset of the second TP relative to the first TP through the reference time-frequency resource position.

It should be understood that, the time-frequency resource position predetermined for the synchronization signal of the second TP may be a time-frequency resource position determined by taking the downlink timing of the first TP as a reference. The time-frequency resource predetermined for the synchronization signal of the second TP may further be promised in advance, for example, an Mth symbol and a fixed bandwidth of an Nth sub-frame.

For example, the terminal may take a time window centered at the estimated time-frequency resource position for the synchronization signal of the second TP and having a length being 0.5 ms as the detection window for the downlink signal of the second TP.

It should be understood that upon the determination of the synchronization reference of the second TP, the terminal may determine a transmission resource position for the downlink signal according to the time-frequency resource for the downlink signal of the second TP, thereby performing detection and measurement.

It is to be noted that when the time synchronization offset of the second TP relative to the first TP is zero, it may be indicated that the second TP is synchronous with the first TP. When the time synchronization offset of the second TP relative to the first TP is not zero, it may be indicated that the second TP is not synchronous (asynchronous) with the first TP.

It should be understood that, the operation that the terminal acquires the synchronization reference of the second TP may refer to that the terminal acquires at least one of a time synchronization reference or a frequency synchronization reference of the second TP. The synchronization reference of the second TP includes information such as symbol clock and frequency information of the second TP, a cell bandwidth, a cell ID, frame block information, a cell multi-antenna configuration, a BCH bandwidth, a length of a CP of a sub-frame where the SCH and the BCH are located or the like.

In an optional embodiment, the operation that the terminal performs downlink signal detection of the second TP according to the system configuration information of the second TP includes the following actions. The terminal detects the synchronization signal of the second TP according to at least one of the time-frequency resource position or sequence information for the synchronization signal of the second TP to obtain the synchronization reference of the second TP, and the terminal performs the downlink signal detection of the second TP according to the synchronization reference of the second TP.

It is to be noted that, when obtaining all configuration information for the synchronization signal of the second TP, the terminal may directly detect the synchronization signal of the second TP based on the configuration information for the synchronization signal of the second TP without a blind detection, thereby reducing the detection complexity of the terminal.

When obtaining a part of configuration information for the synchronization signal of the second TP, the terminal may perform the blind detection on unknown configuration information for the synchronization signal based on the part of configuration information for the synchronization signal. In this case, the solution may reduce the complexity of the downlink signal detection on the second TP to a certain degree and simultaneously may keep a certain flexibility.

It should be understood that, the terminal may further perform the downlink signal detection of the second TP via other information in the system configuration information. For example, the terminal may determine the detection window for the synchronization signal of the second TP according to the time synchronization offset of the second TP relative to the first TP in the system configuration information and the time-frequency resource position for the synchronization signal of the second TP. The terminal performs the detection on the downlink signal of the second TP according to the sequence information for the synchronization signal of the second TP on the detection window.

In an optional embodiment, the system configuration information of the second TP includes the configuration information on the reference signal of the second TP, and the operation that the terminal performs downlink signal detection of the second TP according to the system configuration information of the second TP includes the following actions. The terminal determines a configuration for the reference signal of the second TP according to the configuration information on the reference signal of the second TP and the terminal performs downlink RRM measurement of the second TP according to the configuration for the reference signal of the second TP. The method further includes the following actions. The terminal generates an RRM measurement result, and the terminal sends the RRM measurement result to the first TP, or the terminal determines whether the second TP is detected according to the RRM measurement result.

It should be understood that, the terminal may determine whether to communicate with the second TP according to the RRM measurement result. The terminal may determine whether to access the second TP according to the RRM measurement result. The terminal may determine whether to receive a signal subsequently transmitted by the second TP according to the RRM measurement result.

Further, the terminal may determine whether to send the indication information for indicating whether the second TP is detected to the first TP after detecting the second TP according to the RRM measurement result.

It is to be noted that, the reference signal may include at least one of the CRS or the CSI-RS of the second TP.

For example, the terminal may determine a Resource Block (RE) carrying the CRS and/or the CSI-RS according to CRS and/or CSI-RS configuration information (such as, time-frequency resource positions of CRS and/or CSI-RS) of the second TP. The terminal may measure an average value of powers of the reference signals received on the RE carrying the CRS and/or the CSI-RS.

It should be understood that, the terminal may determine configuration information on the reference signal according to the above configuration information on the reference signal, and may also determine configuration information on the reference signal according to other information of the second TP. The approach for acquiring the configuration information on the reference signal by the terminal is not specifically defined in the disclosure.

For example, the terminal may determine a time-frequency resource position for the CRS and/or the CSI-RS according to the time offset of the second TP relative to the first TP and the configuration information on the reference signal. The time-frequency resource position for the reference signal of the second TP may be further promised in advance.

For example, the terminal may obtain the synchronization reference of the second TP according to the configuration information on the synchronization signal in the system configuration information. The terminal may determine the time-frequency resource position for the CRS and/or the CSI-RS according to the synchronization reference of the second TP and the configuration information on the reference signal of the second TP.

For example, the terminal may determine a sequence for the CRS/the CSI-RS according to the ID information of the second TP and the configuration information on the reference signal of the second TP in the system configuration information.

In an optional embodiment, the system configuration information includes the working frequency point information of the second TP, and the operation that the terminal performs downlink signal detection of the second TP according to the system configuration information of the second TP includes the following actions. The terminal determines a working frequency point of the second TP according to the working frequency point information of the second TP, and the terminal performs the downlink signal detection within a bandwidth where the working frequency point is located.

For example, the terminal may perform the detection on the synchronization signal or the reference signal of the second TP within the bandwidth where the working frequency point of the second TP is located.

In an optional embodiment, the operation that the terminal performs downlink signal detection of the second TP according to the system configuration information of the second TP includes the following actions. The terminal determines at least one of a prefix type or a prefix length of the downlink signal of the second TP according to the prefix information of the signal of the second TP. The terminal performs the downlink signal detection of the second TP, wherein the downlink signal of the second TP is a downlink signal carrying a prefix corresponding to at least one of the prefix type or the prefix length.

Specifically, the prefix type information of the downlink signal may be used for indicating whether a Cyclic Prefix (CP) or a Zero Prefix (ZP) is adopted for the downlink signal.

The prefix length information of the downlink signal may be used for indicating whether a conventional-length prefix or an extended-length prefix is adopted for the downlink signal.

In an optional embodiment, the system configuration information of the second TP includes the sub-carrier spacing information of the second TP, and the operation that the terminal performs downlink signal detection of the second TP according to the system configuration information of the second TP includes the following actions. The terminal determines the number of sub-carriers within a target bandwidth of the second TP according to the sub-carrier spacing information. The terminal performs the downlink signal detection of the second TP according to number of sub-carriers within the target bandwidth.

It is to be noted that, a mapping between a sub-carrier interval and the number of the sub-carriers within a certain bandwidth may be promised in advance. The target bandwidth may be determined according to the system bandwidth of the second TP carried in the system configuration information.

In an optional embodiment, the system configuration information includes the configuration information on structure of sub-frames of the second TP, and the operation that the terminal performs downlink signal detection of the second TP according to the system configuration information of the second TP includes the following actions. The terminal determines a sub-frame structure of the second TP according to the configuration information on structure of sub-frames of the second TP, and the terminal performs the downlink signal detection of the second TP according to the sub-frame structure.

Specifically, the configuration information on structure of sub-frames is used for indicating at least one of the following: the number of OFDM symbols in the sub-frame, the number of the GPs and lengths of the GPs in the sub-frame, configurations on the number of different types of OFDM symbols in the sub-frame, or the number of control symbols and data symbols in the sub-frame.

Herein, the configurations on the number of different types of OFDM symbols in the sub-frame may refer to the number of downlink control/data symbols and the number of uplink control symbols in the sub-frame, may refer to number or proportion configuration of the downlink control symbols and the uplink data symbols in the sub-frame, and may refer to proportion configuration of the downlink control symbols and the uplink data symbols in the sub-frame.

In an optional embodiment, the system configuration information includes the system bandwidth information of the second TP, and the operation that the terminal performs downlink signal detection of the second TP according to the system configuration information of the second TP includes the following actions. The terminal determines a system bandwidth of the second TP according to the system bandwidth information of the second TP, and the terminal performs the downlink signal detection of the second TP within the system bandwidth of the second TP. It should be understood that, the terminal may determine a sequence length of the synchronization signal or the reference signal of the second TP based on the system bandwidth of the second TP, thus performing the detection on the synchronization signal or the reference signal.

In an optional embodiment, the system configuration information includes the configuration information on uplink and downlink time slots of the second TP, and the operation that the terminal performs downlink signal detection of the second TP according to the system configuration information of the second TP includes the following actions. The terminal determines a time-frequency resource position of a downlink signal in the second TP according to the configuration information on the uplink and downlink time slots of the second TP, and the terminal performs the downlink signal detection of the second TP on the time-frequency resource position.

Specifically, the terminal may determine the number and positions of downlink time slots or downlink TTIs within a certain time according to the time slot configuration information. The downlink time slots or the downlink TTIs may be completely or partially used for transmitting the downlink signal of the second TP.

In an optional embodiment, the system configuration information includes the antenna configuration information of the second TP, and the operation that the terminal performs downlink signal detection of the second TP according to the system configuration information of the second TP includes the following actions. The terminal determines an antenna port used by the second TP for transmitting the downlink signal according to the antenna configuration information, and the terminal performs the downlink signal detection of the second TP according to the antenna port. Specifically, the terminal may perform the downlink signal detection of the second TP on each antenna port used by the second TP for transmitting the downlink signal.

In an optional embodiment, the system configuration information includes an ID of the second TP, and the operation that the terminal performs downlink signal detection of the second TP according to the system configuration information of the second TP includes the following actions. The terminal determines at least one of a transmission format or a sequence for the downlink signal of the second TP according to the ID of the second TP, and the terminal performs the downlink signal detection of the second TP according to at least one of the transmission format or the sequence for the downlink signal.

Specifically, the transmission format for the downlink signal of the second TP may include a time-frequency resource position for the downlink signal of the second TP, an information scrambling manner for the downlink signal of the second TP, a sub-carrier interval for the downlink signal of the second TP or the like.

In an optional embodiment, the method further includes the following operations. The terminal generates a measurement result or a detection result for the downlink signal of the second TP, and the terminal sends the measurement result or the detection result to the first TP.

Specifically, the terminal may send the detection result to the first TP, wherein the detection result is used for indicating whether the synchronization signal of the second TP is detected successfully to the first TP. When the terminal detects the synchronization signal of the second TP, the terminal may further send ID information carried in the synchronization signal of the second TP to the first TP. The terminal may also send the measurement result of the RMM measurement performed on the downlink signal to the first TP, such as a Reference Signal Receiving Power (RSRP)/a Reference Signal Receiving Quality (RSRQ); or, the terminal may further send a measurement result of path loss measurement on the downlink signal to the first TP.

In an optional embodiment, the method further includes that: the terminal sends an uplink signal to the second TP according to the system configuration information of the second TP.

In this embodiment of the disclosure, the terminal can acquire the system configuration information of the second TP from the first TP, thereby reducing the complexity of the terminal to perform the signal detection of the second TP.

Figure 2:
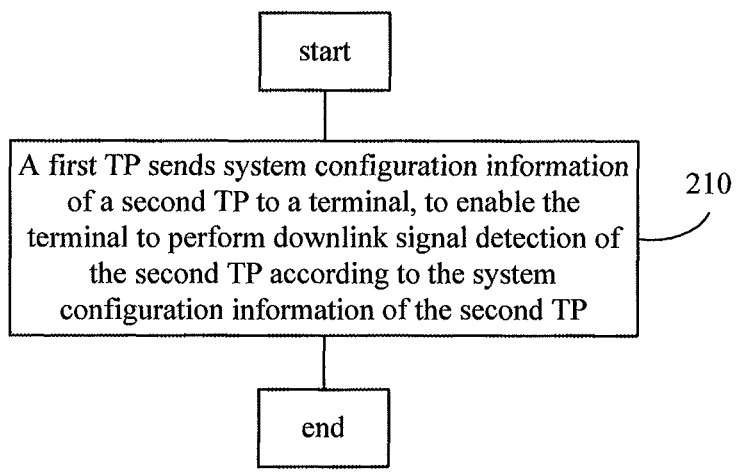
FIG. 2 is a schematic flowchart of a method for signal detection according to another embodiment of the disclosure.

FIG. 2 illustrates a method for signal detection according to another embodiment of the disclosure. The method illustrated in FIG. 2 includes the following operations.

At 210, a first TP sends system configuration information of a second TP to a terminal, to enable the terminal to perform downlink signal detection of the second TP according to the system configuration information of the second TP.

In this embodiment of the disclosure, the terminal can acquire the system configuration information of the second TP from the first TP, thereby reducing the complexity of the terminal to perform the signal detection of the second TP.

In an optional embodiment, the system configuration information includes at least one of the following: working frequency point information of the second TP, system bandwidth information of the second TP, time synchronization information of the second TP relative to the first TP, sub-carrier spacing information of the second TP, prefix information of a signal of the second TP, configuration information on structure of sub-frames of the second TP, configuration information on uplink and downlink time slots of the second TP, configuration information on a synchronization signal of the second TP, configuration information on a reference signal of the second TP, ID information of the second TP or antenna configuration information of the second TP.

In an optional embodiment, the first TP is a carrier for transmitting LTE data, and the second TP is a carrier for transmitting 5G NR data.

In an optional embodiment, the method further includes: the first TP receives a measurement result or a detection result for the downlink signal of the second TP from the terminal.

The method for the signal detection in this embodiment of the disclosure will be described below in detail in combination with FIG. 3, in which the first TP is a cell 1 on an LTE frequency band and the second TP is a cell 2 on a 5G frequency band taken as an example.

Figure 3:
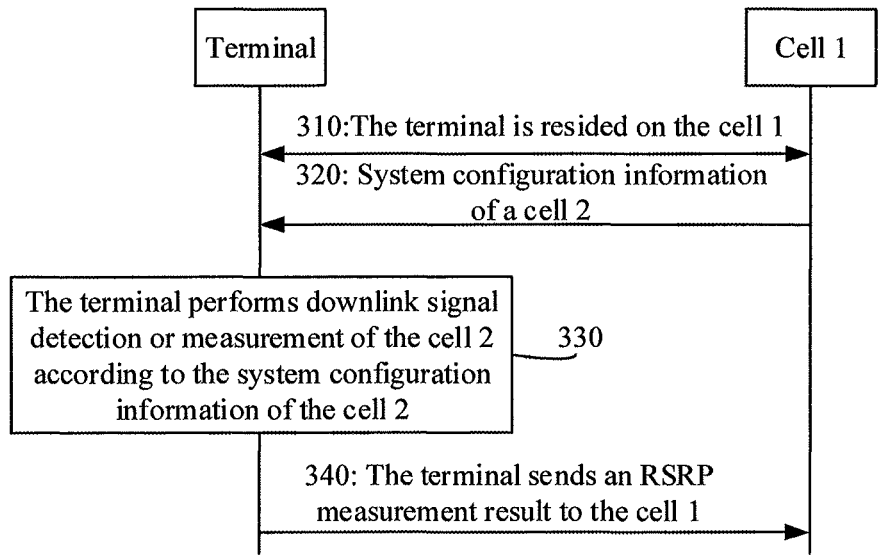
FIG. 3 is a schematic flowchart of a method for signal detection according to another embodiment of the disclosure.

FIG. 3 is a schematic flowchart of a method for signal detection according to another embodiment of the disclosure. The method illustrated in FIG. 3 includes the following operations.

At 310, a terminal is resided on the cell 1 in the LTE frequency band.

Specifically, the cell 1 is a serving cell that provides a service for the terminal.

At 320, the terminal receives system configuration information of a cell 2 from the cell 1.

Specifically, the terminal may receive a high-level signaling sent by the cell 1. The high-level signaling carries the system configuration information of the cell 2, and the system configuration information includes working frequency point information, system bandwidth information, sub-carrier spacing information and CSI-RS configuration information of the cell 2.

At 330, the terminal performs downlink signal detection of the cell 2 according to the system configuration information of the cell 2.

Specifically, the operation at 330 includes the following actions.

At 331, the terminal may determine a working frequency point where the cell 2 is located according to the working frequency point information of the cell 2. The terminal performs blind detection on a synchronization signal of the cell 2 on a frequency band where the working frequency point is located.

At 332, when the terminal does not detect the synchronization signal of the cell 2 according to the system configuration information of the cell 2, the terminal may send a detection result to the cell 1 to notify the cell 1 that the terminal does not detect the downlink signal of the cell 2.

At 333, when the terminal detects the synchronization signal of the cell 2, the terminal may obtain a cell ID and a time-frequency synchronization reference of the cell 2 according to the synchronization signal of the cell 2.

At 334, the terminal may determine the number of sub-carriers on a bandwidth of the cell 2 according to the bandwidth information and the sub-carrier spacing information of the cell 2, and thus determines a CSI-RS sequence length.

It should be understood that, a correspondence among the bandwidth information, the sub-carrier spacing information and the number of the sub-carriers may be promised in advance.

At 335, the terminal generates a CSI-RS sequence based on the CSI-RS sequence length and CSI-RS sequence configuration information.

At 336, the terminal determines a time-frequency resource position of the CSI-RS according to a time-frequency synchronization reference and a CSI-RS time-frequency resource configuration of the cell 2.

At 337, the terminal performs detection of a CSI-RS signal on the time-frequency resource position of the CSI-RS based on the CSI-RS sequence generated by the terminal.

At 338, the terminal measures Reference Signal Receiving Power (RSRP) based on the CSI-RS signal.

At 340, the terminal sends an RSRP measurement result to the cell 1.

It should be understood that, the cell 1 may send system configuration information of multiple cells to the terminal. The terminal may detect each of the multiple cells according to a signal detection process in the method illustrated in FIG. 3. The terminal may send RSRP of each cell to the cell 1, and the cell 1 selects a target cell from the multiple cells according to the RSRP of each cell (for example, the cell 2 described above) as a cell to which the terminal may be accessed.

The method for the signal detection in the another embodiment of the disclosure will be described below in detail in combination with FIG. 4, in which the first TP is a cell 1 on a carrier 1 and the second TP is a cell 2 on a carrier 2 taken as example.

Figure 4:
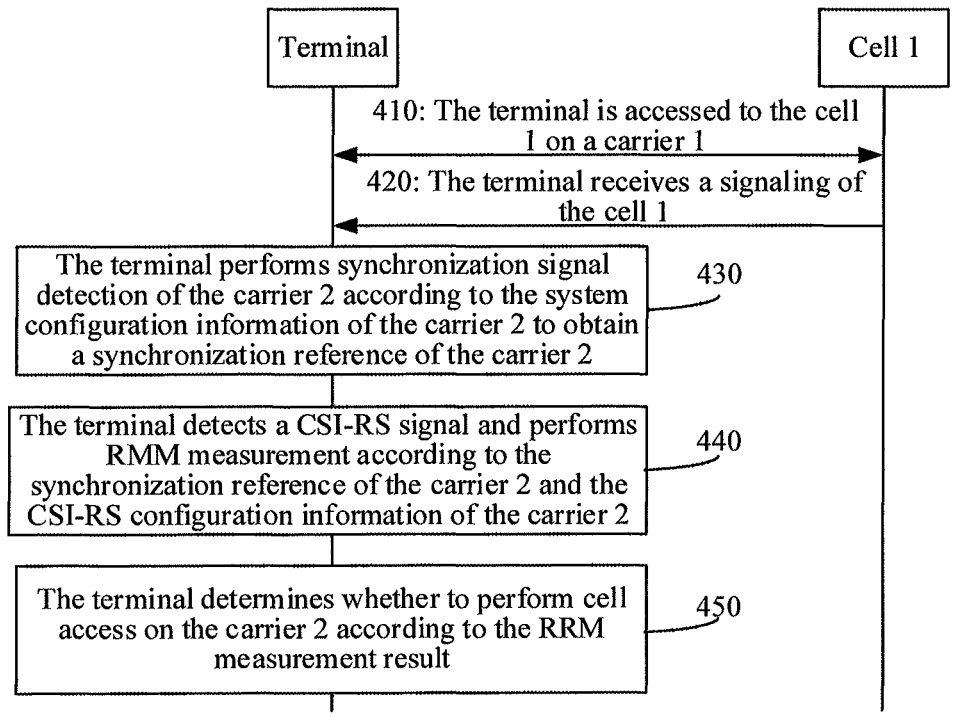
FIG. 4 is a schematic flowchart of a method for signal detection according to another embodiment of the disclosure.

FIG. 4 is a schematic flowchart of a method for signal detection according to another embodiment of the disclosure. The method illustrated in FIG. 4 includes the following operations.

At 410, a terminal is accessed to a cell 1 on a carrier 1.

Specifically, the terminal may take the cell 1 as a serving cell and performs uplink and downlink data transmission through the cell 1.

At 420, the terminal receives a signaling of the cell 1. The signaling carries system configuration information of a carrier 2.

Specifically, the system configuration information of the carrier 2 includes: system bandwidth information of the carrier 2, sub-frame offset information of the carrier 2 relative to the carrier 1, CP length information of the carrier 2, configuration information on uplink and downlink time slots of the carrier 2, and CSI-RS configuration information of the carrier 2.

At 430, the terminal performs synchronization signal detection of the carrier 2 according to the system configuration information of the carrier 2 to obtain a synchronization reference of the carrier 2.

Specifically, the operation 430 includes the following actions.

At 431, the terminal determines a sub-frame offset of the carrier 2 relative to the carrier 1 according to the sub-frame offset information of the carrier 2 relative to the carrier 1.

At 432, the terminal determines a time-frequency resource estimated position for the synchronization signal on the carrier 2 according to the sub-frame offset and a time-frequency resource position, promised in advance, of the synchronization signal. Specifically, the terminal may perform offset on the time-frequency resource position of the synchronization signal according to the time offset corresponding to the sub-frame offset and determines the offset time-frequency resource position as the time-frequency resource estimated position for the synchronization signal of the carrier 2. The time-frequency resource position may be a time-frequency resource position of the synchronization signal that is determined based on downlink timing of the carrier 1.

For example, the time-frequency resource position, promised in advance, of the synchronization signal may be on a fixed bandwidth for an Mth symbol of an Nth sub-frame, wherein N and M both are a fixed value.

At 433, the terminal performs the synchronization signal detection of the carrier 2 within a time range of a sub-frame length nearby the time-frequency resource estimated position for the synchronization signal of the carrier 2.

At 434, the terminal determines a synchronization reference of the carrier 2 according to the detected synchronization signal.

Specifically, the synchronization reference may be at least one of a time synchronization reference or a frequency synchronization reference of the carrier 2.

At 440, the terminal detects a CSI-RS signal and performs RMM measurement according to the synchronization reference of the carrier 2 and the CSI-RS configuration information of the carrier 2.

Specifically, the operation 440 includes the following actions.

At 441, the terminal may determine the number of sub-carriers on a bandwidth of the carrier 2 according to the bandwidth configuration information and the sub-carrier spacing information of the carrier 2, and thus determines a CSI-RS sequence length.

It should be understood that a correspondence among a bandwidth, a sub-carrier interval and the number of the sub-carriers of the carrier 2 may be promised in advance.

At 442, the terminal generates a CSI-RS sequence based on the CSI-RS sequence length and CSI-RS sequence configuration information.

At 443, the terminal determines a time-frequency resource occupied by the CSI-RS signal according to the CP length information of the carrier 2, the configuration information on uplink and downlink time slots of the carrier 2 and the CSI-RS time-frequency resource configuration information.

At 444, the terminal performs the detection of the CSI-RS signal and determines an RRM measurement result based on the synchronization reference of the carrier 2, the time-frequency resource occupied by the CSI-RS and the CSI-RS sequence generated by the terminal.

At 450, the terminal determines whether to perform cell access on the carrier 2 according to the RRM measurement result.

It should be understood that, the terminal may send an RRM measurement result to the cell 1, so that the cell 1 determines whether the terminal performs the cell access on the carrier 2.

The method for the signal detection in the embodiments of the disclosure has been described above in combination with FIG. 1 to FIG. 4. A device for signal detection in the embodiments of the disclosure will be described below in detail in combination with FIG. 5 to FIG. 8. It should be understood that the device illustrated in FIG. 5 and FIG. 7 can implement each operation in FIG. 1 and the device illustrated in FIG. 6 and FIG. 8 can implement each operation in FIG. 2, which will not be elaborated herein to avoid repetitions.

Figure 5:
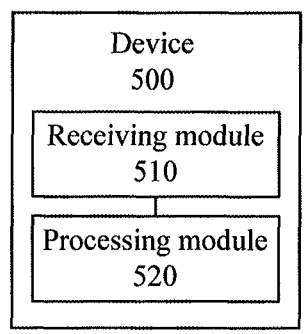
FIG. 5 is a schematic block diagram of a device for signal detection according to an embodiment of the disclosure.

FIG. 5 is a schematic block diagram of a device for signal detection according to an embodiment of the disclosure. The device illustrated in FIG. 5 may be a terminal. The device 500 illustrated in FIG. 5 includes a receiving module 510 and a processing module 520.

The receiving module 510 is configured to receive from a first TP system configuration information of a second TP.

The processing module 520 is configured to perform downlink signal detection of the second TP according to the system configuration information, received by the receiving module, of the second TP.

In this embodiment of the disclosure, the terminal can acquire the system configuration information of the second TP from the first TP, thereby reducing the complexity of the terminal to perform the signal detection of the second TP.

In an optional embodiment, the system configuration information may include at least one of the following: working frequency point information of the second TP, system bandwidth information of the second TP, time synchronization information of the second TP relative to the first TP, sub-carrier spacing information of the second TP, prefix information of a signal of the second TP, configuration information on structure of sub-frames of the second TP, configuration information on uplink and downlink time slots of the second TP, configuration information on a synchronization signal of the second TP, configuration information on a reference signal of the second TP, ID information of the second TP or antenna configuration information of the second TP.

In an optional embodiment, the time synchronization information of the second TP relative to the first TP may include at least one of indication information for indicating whether the second TP is synchronous with the first TP, or a time synchronization offset of the second TP relative to the first TP.

In an optional embodiment, the time synchronization information may include the indication information for indicating whether the second TP is synchronous with the first TP. The processing module may specifically be configured to: perform, responsive to indicating that the second TP is synchronous with the first TP, the downlink signal detection of the second TP according to downlink timing of the first TP; or, determine a detection window for the synchronization signal of the second TP according to the downlink timing of the first TP, perform synchronization signal detection of the second TP in the detection window to obtain synchronization reference of the second TP and perform the downlink signal detection of the second TP according to the synchronization reference of the second TP.

In an optional embodiment, the time synchronization information may include the indication information for indicating whether the second TP is synchronous with the first TP. The processing module may further be configured to: detect, responsive to indicating that the second TP is asynchronous with the first TP, the synchronization signal of the second TP to obtain the synchronization reference of the second TP and perform the downlink signal detection of the second TP according to the synchronization reference of the second TP.

In an optional embodiment, the time synchronization offset of the second TP relative to the first TP may include at least one of: a radio frame offset of the second TP relative to the first TP, a sub-frame offset of the second TP relative to the first TP, a TTI offset of the second TP relative to the first TP, or a transmission symbol offset of the second TP relative to the first TP.

In an optional embodiment, the time synchronization information may include the time synchronization offset of the second TP relative to the first TP. The processing module may specifically be configured to: determine a detection window for the synchronization signal of the second TP according to the time synchronization offset and a time-frequency resource predetermined for the synchronization signal of the second TP, perform synchronization signal detection of the second TP in the detection window to obtain synchronization reference of the second TP, and perform the downlink signal detection of the second TP according to the synchronization reference of the second TP.

In an optional embodiment, the configuration information on the synchronization signal of the second TP may include at least one of resource position information of the synchronization signal or sequence information carried in the synchronization signal.

In an optional embodiment, the processing module may specifically be configured to: determine at least one of time-frequency resource position or sequence information for the synchronization signal of the second TP according to at least one of the resource position information of the synchronization signal or the sequence information carried in the synchronization signal, detect the synchronization signal of the second TP according to at least one of the time-frequency resource position or sequence information to obtain synchronization reference of the second TP, and perform the downlink signal detection of the second TP according the synchronization reference of the second TP.

In an optional embodiment, the configuration information on the reference signal of the second TP may include at least one of: configuration information on time-frequency resources of the reference signal, sequence information of the reference signal, configuration information on transmitting power of the reference signal or port configuration information of the reference signal.

In an optional embodiment, the system configuration information of the second TP may include the configuration information on the reference signal of the second TP. The processing module may specifically be configured to: determine a configuration for the reference signal of the second TP according to the configuration information on the reference signal of the second TP and perform downlink RRM measurement of the second TP according to the configuration for the reference signal of the second TP. The device may further include: a first generation module, configured to generate an RRM measurement result; a first sending module, configured to send the RRM measurement result to the first TP; or, a determination module, configured to determine whether the second TP is detected according to the RRM measurement result.

In an optional embodiment, the system configuration information may include the working frequency point information of the second TP. The processing module may specifically be configured to determine a working frequency point of the second TP according to the working frequency point information of the second TP and perform the downlink signal detection within a bandwidth where the working frequency point is located.

In an optional embodiment, the prefix information for the signal of the second TP may include at least one of prefix type information or prefix length information.

In an optional embodiment, the processing module may specifically be configured to: determine at least one of a prefix type or a prefix length of the downlink signal of the second TP according to the prefix information of the signal of the second TP and perform the downlink signal detection of the second TP. The downlink signal of the second TP may be a downlink signal carrying a prefix corresponding to at least one of the prefix type or the prefix length.

In an optional embodiment, the system configuration information of the second TP may include the sub-carrier spacing information of the second TP. The processing module may specifically be configured to: determine the number of sub-carriers within a target bandwidth of the second TP according to the sub-carrier spacing information and perform the downlink signal detection of the second TP according to the number of sub-carriers within the target bandwidth.

In an optional embodiment, the configuration information on structure of sub-frames of the second TP may include at least one of the number of OFDM symbols in a sub-frame, the number of GPs in the sub-frame, positions of the GPs in the sub-frame, or the number of different types of OFDM symbols in the sub-frame.

In an optional embodiment, the system configuration information may include the configuration information on structure of sub-frames of the second TP, and the processing module may be configured to determine a sub-frame structure of the second TP according to the configuration information on structure of sub-frames of the second TP and perform the downlink signal detection of the second TP according to the sub-frame structure.

In an optional embodiment, the system configuration information may include the system bandwidth information of the second TP, and the processing module may be configured to determine a system bandwidth of the second TP according to the system bandwidth information of the second TP, and perform the downlink signal detection of the second TP within the system bandwidth of the second TP.

In an optional embodiment, the system configuration information may include the configuration information on the uplink and downlink time slots of the second TP, and the processing module may be configured to determine a time-frequency resource position of a downlink signal transmitted in the second TP according to the configuration information on uplink and downlink time slots of the second TP and perform the downlink signal detection of the second TP on the time-frequency resource position.

In an optional embodiment, the system configuration information may include the antenna configuration information of the second TP. The processor may be configured to determine an antenna port used by the second TP for transmitting the downlink signal according to the antenna configuration information, and perform the downlink signal detection of the second TP according to the antenna port.

In an optional embodiment, the system configuration information may include an ID of the second TP. The processor may be configured to determine at least one of a transmission format or a sequence for the downlink signal of the second TP according to the ID of the second TP, and perform the downlink signal detection of the second TP according to at least one of the transmission format or the sequence for the downlink signal.

In an optional embodiment, the first TP may be a carrier for transmitting LTE data, and the second TP may be a carrier for transmitting 5G NR data.

In an optional embodiment, the device further may include a second generation module and a second sending module. The second generation module may be configured to generate a measurement result or a detection result for the downlink signal of the second TP. The second sending module may be configured to send the measurement result or the detection result to the first TP.

In an optional embodiment, the device may further include a third sending module. The third sending module may be configured to send an uplink signal to the second TP according to the system configuration information of the second TP.

Figure 6:
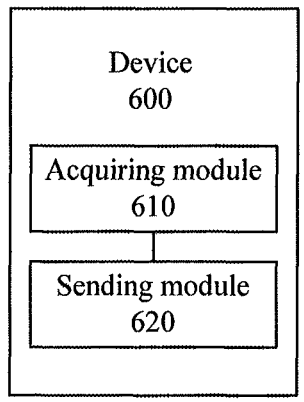
FIG. 6 is a schematic block diagram of a device for signal detection according to another embodiment of the disclosure.

FIG. 6 is a schematic block diagram of a device for signal detection according to another embodiment of the disclosure. The device 600 for the signal detection illustrated in FIG. 6 includes an acquiring module 610 and a sending module 620.

The acquiring module 610 is configured to acquire system configuration information of the second TP.

The sending module 620 is configured to send the system configuration information of the second TP to a terminal, to enable the terminal to perform downlink signal detection of the second TP according to the system configuration information of the second TP.

In this embodiment of the disclosure, the terminal can acquire the system configuration information of the second TP from the first TP, thereby reducing the complexity of the terminal to perform the signal detection of the second TP.

In an optional embodiment, the system configuration information may include at least one of the following: working frequency point information of the second TP, system bandwidth information of the second TP, time synchronization information of the second TP relative to the first TP, sub-carrier spacing information of the second TP, prefix information of a signal of the second TP, configuration information on structure of sub-frames of the second TP, configuration information on uplink and downlink time slots of the second TP, configuration information on a synchronization signal of the second TP, configuration information on a reference signal of the second TP, ID information of the second TP or antenna configuration information of the second TP.

In an optional embodiment, the first TP may be a carrier for transmitting LTE data, and the second TP may be a carrier for transmitting 5G NR data.

In an optional embodiment, the device may further include a receiving module. The receiving module may be configured to receive a measurement result or a detection result sent by the terminal for the downlink signal of the second TP.

Figure 7:
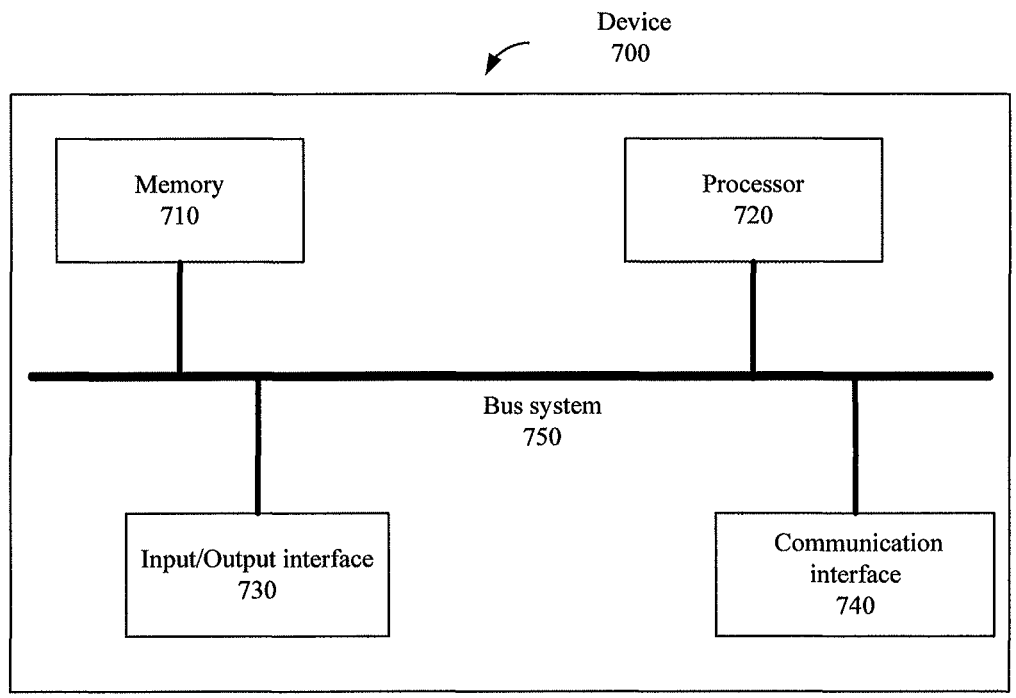
FIG. 7 is a schematic block diagram of a device for signal detection according to another embodiment of the disclosure.

FIG. 7 is a schematic block diagram of a device for signal detection according to another embodiment of the disclosure. The device 700 for the signal detection illustrated in FIG. 7 includes a memory 710, a processor 720, an input/output interface 730, a communication interface 740 and a bus system 750. The memory 710, the processor 720, the input/output interface 730 and the communication interface 740 are connected via the bus system 750. The memory 710 may be configured to store an instruction. The processor 720 may be configured to execute the instruction stored in the memory 720 to control the input/output interface 730 to receive input data and information, output data such as an operation result and control the communication interface 740 to transmit a signal.

The receiving module 740 may be configured to receive from a first TP system configuration information of a second TP.

The processor 720 may be configured to perform downlink signal detection of the second TP according to the system configuration information of the second TP.

It should be understood that in the embodiments of the disclosure, the processor 720 may adopt a universal Central Processing Unit (CPU), a microprocessor, an Application Specific Integrated Circuit (ASIC) or one or more integrated circuit, and may be configured to execute a related program to implement the technical solutions provided in the embodiments of the disclosure.

It should be further understood that the communication interface 740 employs, for example but not limited to, a transceiver device such as a transceiver to implement communication between the device 700 for signal detection and other devices or communication networks.

The memory 710 may include a Read-Only Memory (ROM) and a Random-Access Memory (RAM) and provides instructions and data to the processor 720. A part of the processor 720 may further include a nonvolatile RAM. For example, the processor 720 may further store information of a device type.

The bus system 750 may include a data bus, and may further include a power bus, a control bus, a state signal bus and the like. However, for clear description, various buses in the figure are marked as the bus system 750.

In an implementation process, each operation of the method may be completed by an integrated logic circuit of hardware in the processor 720 or an instruction in a software form. The method for signal detection disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically Erasable PROM (EEPROM) and a register. The storage medium is located in the memory 710. The processor 720 reads information in the memory 710 and completes the operations of the method in combination with hardware. No more detailed descriptions will be made herein to avoid repetitions.

In this embodiment of the disclosure, the terminal can acquire the system configuration information of the second TP from the first TP, thereby reducing the complexity of the terminal to perform the signal detection of the second TP.

In an optional embodiment, the system configuration information includes at least one of the following: working frequency point information of the second TP, system bandwidth information of the second TP, time synchronization information of the second TP relative to the first TP, sub-carrier spacing information of the second TP, prefix information of a signal of the second TP, configuration information on structure of sub-frames of the second TP, configuration information on uplink and downlink time slots of the second TP, configuration information on a synchronization signal of the second TP, configuration information on a reference signal of the second TP, ID information of the second TP or antenna configuration information of the second TP.

In an optional embodiment, the time synchronization information of the second TP relative to the first TP includes at least one of indication information for indicating whether the second TP is synchronous with the first TP, or a time synchronization offset of the second TP relative to the first TP.

In an optional embodiment, the time synchronization information includes the indication information for indicating whether the second TP is synchronous with the first TP or not, and the processor may specifically be configured to: perform, when the second TP is synchronous with the first TP, the downlink signal detection of the second TP according to downlink timing of the first TP; or, determine a detection window for the synchronization signal of the second TP according to the downlink timing of the first TP, perform synchronization signal detection of the second TP in the detection window to obtain synchronization reference of the second TP and perform the downlink signal detection of the second TP according to the synchronization reference of the second TP.

In an optional embodiment, the time synchronization information includes the indication information for indicating whether the second TP is synchronous with the first TP, and the processing module may further be configured to detect, when the second TP is asynchronous with the first TP, the synchronization signal of the second TP to obtain synchronization reference of the second TP and perform the downlink signal detection of the second TP according to the synchronization reference of the second TP.

In an optional embodiment, the time synchronization offset of the second TP relative to the first TP may include at least one of a radio frame offset of the second TP relative to the first TP, a sub-frame offset of the second TP relative to the first TP, a ITT offset of the second TP relative to the first TP, or a transmission symbol offset of the second TP relative to the first TP.

In an optional embodiment, the time synchronization information includes the time synchronization offset of the second TP relative to the first TP. The processor may specifically be configured to determine a detection window for the synchronization signal of the second TP according to the time synchronization offset and a time-frequency resource predetermined for the synchronization signal of the second TP, perform synchronization signal detection of the second TP in the detection window to obtain synchronization reference of the second TP and perform the downlink signal detection of the second TP according to the synchronization reference of the second TP.

In an optional embodiment, the configuration information on the synchronization signal of the second TP includes at least one of resource position information of the synchronization signal or sequence information carried in the synchronization signal.

In an optional embodiment, the processor may specifically be configured to determine at least one of time-frequency resource position or sequence information for the synchronization signal of the second TP according to at least one of the resource position information of the synchronization signal or the sequence information carried in the synchronization signal, detect the synchronization signal of the second TP according to at least one of the time-frequency resource position or sequence information to obtain the synchronization reference of the second TP and perform the downlink signal detection of the second TP according the synchronization reference of the second TP.

In an optional embodiment, the configuration information on the reference signal of the second TP includes at least one of the following: configuration information on time-frequency resources of the reference signal, sequence information of the reference signal, configuration information on transmitting power of the reference signal or port configuration information of the reference signal.

In an optional embodiment, the system configuration information of the second TP includes the configuration information on the reference signal of the second TP. The processor may specifically be configured to determine a configuration for the reference signal of the second TP according to the configuration information on the reference signal of the second TP and perform downlink RRM measurement of the second TP according to the configuration for the reference signal of the second TP. The device further may include: a first generation module, configured to generate an RRM measurement result; a first sending module, configured to send the RRM measurement result to the first TP; or, a determination module, configured to determine whether the second TP is detected according to the RRM measurement result.

In an optional embodiment, the system configuration information includes the working frequency point information of the second TP. The processor may specifically be specifically configured to determine a working frequency point of the second TP according to the working frequency point information of the second TP and perform the downlink signal detection within a bandwidth where the working frequency point is located.

In an optional embodiment, the prefix information for the signal of the second TP includes at least one of prefix type information or prefix length information.

In an optional embodiment, the processor may specifically be configured to determine at least one of a prefix type or a prefix length of the downlink signal of the second TP according to the prefix information of the signal of the second TP, and perform the downlink signal detection of the second TP. The downlink signal of the second TP may be a downlink signal carrying a prefix corresponding to at least one of the prefix type or the prefix length.

In an optional embodiment, the system configuration information of the second TP includes the sub-carrier spacing information of the second TP. The processor may specifically be configured to determine the number of sub-carriers within a target bandwidth of the second TP according to the sub-carrier spacing information and perform the downlink signal detection of the second TP according to the number of sub-carriers within the target bandwidth.

In an optional embodiment, the configuration information on structure of sub-frames of the second TP includes at least one of the number of OFDM symbols in a sub-frame, the number of GPs in the sub-frame, positions of the GPs in the sub-frame, or the number of different types of OFDM symbols in the sub-frame.

In an optional embodiment, the system configuration information includes the configuration information on structure of sub-frames of the second TP. The processor may be configured to determine a sub-frame structure of the second TP according to the configuration information on structure of sub-frames of the second TP and perform the downlink signal detection of the second TP according to the sub-frame structure.

In an optional embodiment, the system configuration information includes the system bandwidth information of the second TP. The processor may be configured to determine a system bandwidth of the second TP according to the system bandwidth information of the second TP and perform the downlink signal detection of the second TP within the system bandwidth of the second TP.

In an optional embodiment, the system configuration information includes the configuration information on uplink and downlink time slots of the second TP. The processor may be configured to: determine a time-frequency resource position of a downlink signal transmitted in the second TP according to the configuration information on uplink and downlink time slots of the second TP and perform the downlink signal detection of the second TP on the time-frequency resource position.

In an optional embodiment, the system configuration information includes the antenna configuration information of the second TP. The processor may be configured to determine an antenna port used by the second TP for transmitting the downlink signal according to the antenna configuration information and perform the downlink signal detection of the second TP according to the antenna port.

In an optional embodiment, the system configuration information includes an ID of the second TP. The processor may be configured to determine at least one of a transmission format or a sequence for the downlink signal of the second TP according to the ID of the second TP and perform the downlink signal detection of the second TP according to at least one of the transmission format or the sequence for the downlink signal.

In an optional embodiment, the first TP may be a carrier for transmitting LTE data, and the second TP may be a carrier for transmitting 5G NR data.

In an optional embodiment, the processor may further be configured to generate a measurement result or a detection result for the downlink signal of the second TP. The communication interface may be configured to send the measurement result or the detection result to the first TP.

In an optional embodiment, the communication interface may be configured to send an uplink signal to the second TP according to the system configuration information of the second TP.

Figure 8:
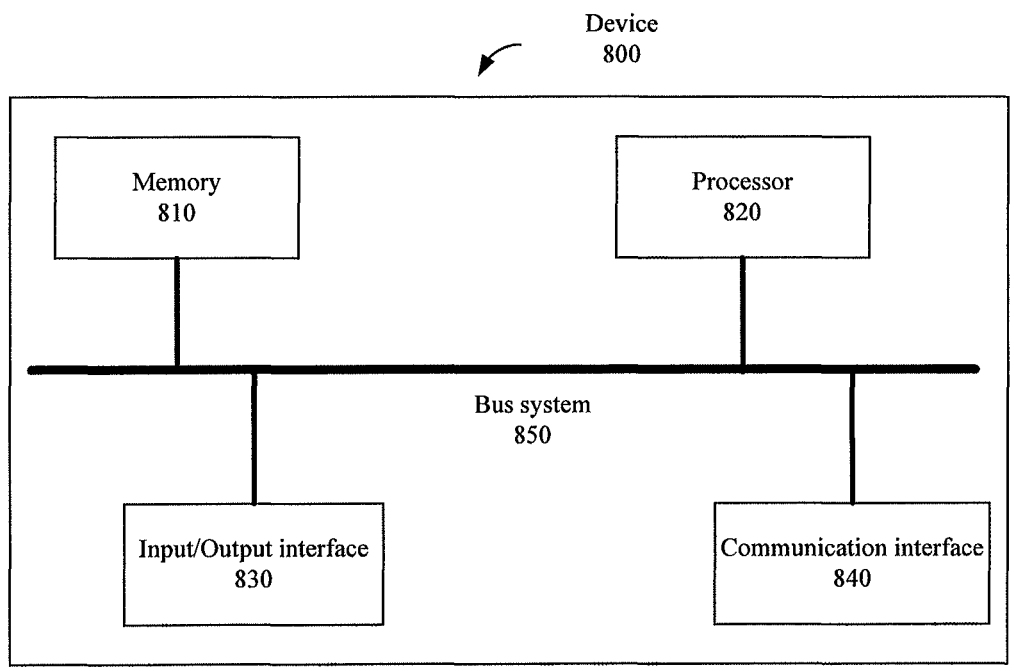
FIG. 8 is a schematic block diagram of a device for signal detection according to another embodiment of the disclosure.

FIG. 8 is a schematic block diagram of a device for signal detection according to another embodiment of the disclosure. The device 800 for the signal detection illustrated in FIG. 8 may be a first TP. The device 800 includes a memory 810, a processor 820, an input/output interface 830, a communication interface 840 and a bus system 850. The memory 810, the processor 820, the input/output interface 830 and the communication interface 840 are connected via the bus system 850. The memory 810 may be configured to store an instruction. The processor 820 may be configured to execute the instruction stored in the memory 820 to control the input/output interface 830 to receive input data and information, output data such as an operation result and control the communication interface 840 to transmit a signal.

The processor 820 may be configured to acquire system configuration information of a second TP.

The communication interface 840 may be configured to send system configuration information of the second TP to a terminal, to enable the terminal to perform downlink signal detection of the second TP according to the system configuration information of the second TP.

It should be understood that in the embodiments of the disclosure, the processor 820 may adopt a universal Central Processing Unit (CPU), a microprocessor, an Application Specific Integrated Circuit (ASIC) or one or more integrated circuit, and may be configured to execute a related program to implement the technical solutions provided in the embodiments of the disclosure.

It should be further understood that the communication interface 840 employs, for example but not limited to, a transceiver device such as a transceiver to implement communication between the device 800 for signal detection and other devices or communication networks.

The memory 810 may include a Read-Only Memory (ROM) and a Random-Access Memory (RAM) and provides instructions and data to the processor 820. A part of the processor 820 may further include a nonvolatile RAM. For example, the processor 820 may further store information of a device type.

The bus system 850 may include a data bus, and may further include a power bus, a control bus, a state signal bus and the like. However, for clear description, various buses in the figure are marked as the bus system 850.

In an implementation process, each operation of the method may be completed by an integrated logic circuit of hardware in the processor 820 or an instruction in a software form. The method for signal detection disclosed in combination with the embodiments of the disclosure may be directly embodied to be executed and completed by a hardware processor or executed and completed by a combination of hardware and software modules in the processor.

The software module may be located in a mature storage medium in this field such as a RAM, a flash memory, a ROM, a Programmable ROM (PROM) or Electrically Erasable PROM (EEPROM) and a register. The storage medium is located in the memory 810. The processor 820 reads information in the memory 810 and completes the operations of the method in combination with hardware. No more detailed descriptions will be made herein to avoid repetitions.

In this embodiment of the disclosure, the terminal can acquire the system configuration information of the second TP from the first TP, thereby reducing the complexity of the terminal to perform the signal detection of the second TP.

In an optional embodiment, the system configuration information includes at least one of the following: working frequency point information of the second TP, system bandwidth information of the second TP, time synchronization information of the second TP relative to the first TP, sub-carrier spacing information of the second TP, prefix information of a signal of the second TP, configuration information on structure of sub-frames of the second TP, configuration information on uplink and downlink time slots of the second TP, configuration information on a synchronization signal of the second TP, configuration information on a reference signal of the second TP, ID information of the second TP or antenna configuration information of the second TP.

In an optional embodiment, the first TP may be a carrier for transmitting LTE data, and the second TP may be a carrier for transmitting 5G NR data.

In an optional embodiment, the communication interface may be configured to receive a measurement result or a detection result for the downlink signal of the second TP from the terminal.

It should be understood that in the embodiments of the disclosure, "B corresponding to A" represents that B is associated with A and B may be determined according to A. It is also to be understood that determining B according to A does not mean that B is determined only according to A and B may also be determined according to A and/or other information.

It should be understood that term "and/or" in the disclosure is only an association relationship for describing associated objects and represents that three relationships may exist. For example, A and/or B may represent three conditions: i.e., independent existence of A, existence of both A and B and independent existence of B. In addition, the character "/" in the disclosure usually represents that previous and next associated objects form an "or" relationship.

It should be understood that in various embodiments of the disclosure, a sequence number of each process does not mean an execution sequence and the execution sequence of each process should be determined by its function and an internal logic and should not form any limit to an implementation process of the embodiments of the disclosure.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of, different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:
1. A method for signal detection, comprising:
receiving, by a terminal, system configuration information of a second TP, from a first Transmission Point (TP), wherein the system configuration information comprises time synchronization information and sub-carrier spacing information of the second TP, and the time synchronization information of the second TP comprises indication information for indicating whether the second TP is synchronous with the first TP; and performing, by the terminal, downlink signal detection of the second TP according to downlink timing of the first TP, when the indication information indicates that the second TP is synchronous with the first TP, wherein the first TP is a carrier on a Long Term Evolution (LTE) frequency band, and the second TP is a carrier on a 5th-Generation (5G) New Radio (NR) frequency band.

2. The method of claim 1, wherein the system configuration information further comprises at least one of the following information:

working frequency point information of the second TP, system bandwidth information of the second TP, prefix information of a signal of the second TP, configuration information on structure of a sub-frames of the second TP, configuration information on uplink and downlink time slots of the second TP, configuration information on a synchronization signal of the second TP, configuration information on a reference signal of the second TP, Identifier (ID) information of the second TP or antenna configuration information of the second TP.

3. The method of claim 2, wherein the configuration information on the synchronization signal of the second TP comprises at least one of resource position information of the synchronization signal or sequence information carried in the synchronization signal.

4. The method of claim 3, wherein the system configuration information of the second TP comprises the configuration information on the synchronization signal of the second TP, and the method further comprises:

determining, by the terminal, at least one of time-frequency resource position or sequence information on the synchronization signal of the second TP according to at least one of the resource position information of the synchronization signal or the sequence information carried in the synchronization signal;

detecting, by the terminal, the synchronization signal of the second TP according to at least one of the time-frequency resource position or sequence information to obtain synchronization reference of the second TP; and performing, by the terminal, the downlink signal detection of the second TP according to the synchronization reference of the second TP.

5. The method of claim 2, wherein the configuration information on the reference signal of the second TP comprises at least one of the following information:

configuration information on time-frequency resources of the reference signal, sequence information of the reference signal, configuration information on transmitting power of the reference signal or port configuration information of the reference signal.

6. The method of claim 5, wherein the system configuration information of the second TP comprises the configuration information on the reference signal of the second TP, and the method further comprises:

determining, by the terminal, a configuration for the reference signal of the second TP according to the configuration information on the reference signal of the second TP; and performing, by the terminal, downlink Radio Resource Management (RRM) measurement of the second TP according to the configuration for the reference signal of the second TP; and the method further comprises:

generating, by the terminal, an RRM measurement result; and sending, by the terminal, the RRM measurement result to the first TP; or, determining, by the terminal, whether the second TP is detected according to the RRM measurement result.

7. The method of claim 2, wherein the configuration information on structure of sub-frames of the second TP comprises at least one of: a number of Orthogonal Frequency Division Multiplexing (OFDM) symbols in a sub-frame, a number of Guard Periods (GPs) in the sub-frame, positions of the GPs in the sub-frame, or a number of different types of OFDM symbols in the sub-frame.

8. The method of claim 7, wherein the system configuration information comprises the configuration information on structure of sub-frames of the second TP, and the method further comprises:

determining, by the terminal, a sub-frame structure of the second TP according to the configuration information on structure of sub-frames of the second TP; and performing, by the terminal, the downlink signal detection of the second TP according to the sub-frame structure.

9. The method of claim 2, wherein the system configuration information comprises the antenna configuration information of the second TP, and the method further comprises:

determining, by the terminal, an antenna port used by the second TP for transmitting the downlink signal according to the antenna configuration information; and performing, by the terminal, the downlink signal detection of the second TP according to the antenna port.

10. The method of claim 1, wherein the time synchronization information of the second TP further comprises a time synchronization offset of the second TP relative to the first TP.

11. The method of claim 1, further comprising:

detecting, by the terminal, the synchronization signal of the second TP to obtain synchronization reference of the second TP, when the indication information indicates that the second TP is asynchronous with the first TP; and performing, by the terminal, the downlink signal detection of the second TP according to the synchronization reference of the second TP.

12. The method of claim 1, wherein the system configuration information of the second TP comprises the sub-carrier spacing information of the second TP, and the method further comprises:

determining, by the terminal, a number of sub-carriers within a target bandwidth of the second TP according to the sub-carrier spacing information; and performing, by the terminal, the downlink signal detection of the second TP according to the number of sub-carriers within the target bandwidth.

13. The method of claim 1, further comprising:

generating, by the terminal, a measurement result or a detection result for the downlink signal of the second TP; and sending, by the terminal, the measurement result or the detection result to the first TP.

14. The method of claim 1, further comprising:

sending, by the terminal, an uplink signal to the second TP according to the system configuration information of the second TP.

15. A method for signal detection, comprising:

sending, by a first Transmission Point (TP), system configuration information of a second TP to a terminal, wherein the system configuration information comprises time synchronization information and sub-carrier spacing information of the second TP, and the time synchronization information of the second TP comprises indication information for indicating whether the second TP is synchronous with the first TP, to enable the terminal to perform downlink signal detection of the second TP according to downlink timing of the first TP, when the indication information indicates that the second TP is synchronous with the first TP;

wherein the first TP is a carrier on a Long Term Evolution (LTE) frequency band, and the second TP is a carrier on a 5th-Generation (5G) New Radio (NR) frequency band.

16. The method of claim 15, wherein the system configuration information further comprises at least one of the following information:

working frequency point information of the second TP, system bandwidth information of the second TP, prefix information of a signal of the second TP, configuration information on structure of sub-frames of the second TP, configuration information on uplink and downlink time slots of the second TP, configuration information on a synchronization signal of the second TP, configuration information on a reference signal of the second TP, Identifier (ID) information of the second TP or antenna configuration information of the second TP.

17. A device for signal detection, comprising: a memory and a processor, the memory storing one or more computer programs that, when executed by the processor, cause the processor to execute operations comprising:

receiving from a first Transmission Point (TP) system configuration information of a second TP, wherein the system configuration information comprises time synchronization information and sub-earner spacing information of the second TP, and the lime synchronization information of the second TP comprises indication information for indicating whether the second TP is synchronous with the first TP; and performing downlink signal detection of the second TP according to downlink timing of the first TP, when the indication information indicates that the second TP is synchronous with the first TP;

wherein the first TP is a carrier on a Long Term Evolution (LTE) frequency band, and the second TP is a carrier on a 5th-Generation (5G) New Radio (NR) frequency band.

18. The device of claim 17, wherein the system configuration information further comprises at least one of the following information:

working frequency point information of the second TP, system bandwidth information of the second TP, prefix information of a signal of the second TP, configuration information on structure of sub-frames of the second TP, configuration information on uplink and downlink time slots of the second TP, configuration information on a synchronization signal of the second TP, configuration information on a reference signal of the second TP, Identifier (ID) information of the second TP or antenna configuration information of the second TP.

* * * * *